(No Model.)  6 Sheets—Sheet 2.

G. W. MEAD.
GRAIN SCOURING OR POLISHING MACHINE.

No. 522,996. Patented July 17, 1894.

Witnesses
C. B. Baenziger
John F. Miller

Inventor
George W. Mead
By his Attorney
Newell S. Wright (No Model.) 6 Sheets—Sheet 3.
G. W. MEAD.
GRAIN SCOURING OR POLISHING MACHINE.
No. 522,996. Patented July 17, 1894.
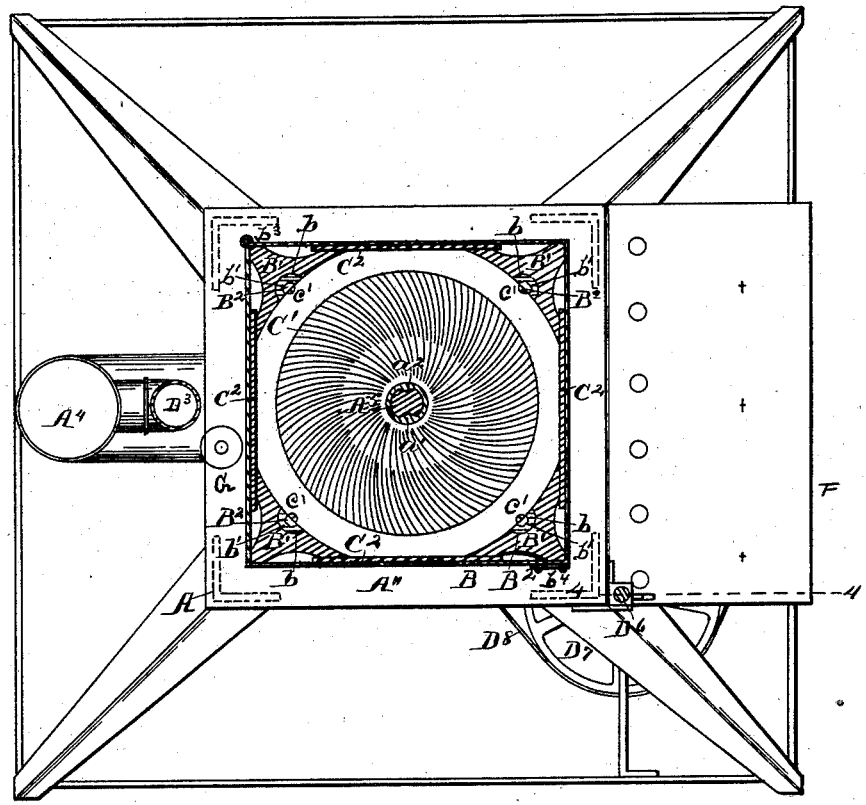
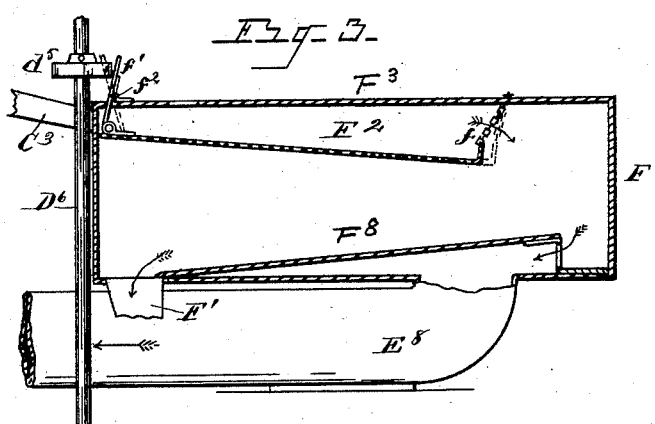
Fig. 3.
Fig. 4.
WITNESSES
O. B. Baenziger
John F. Miller
INVENTOR
George W. Mead
By his Attorney
Newell S. Wright

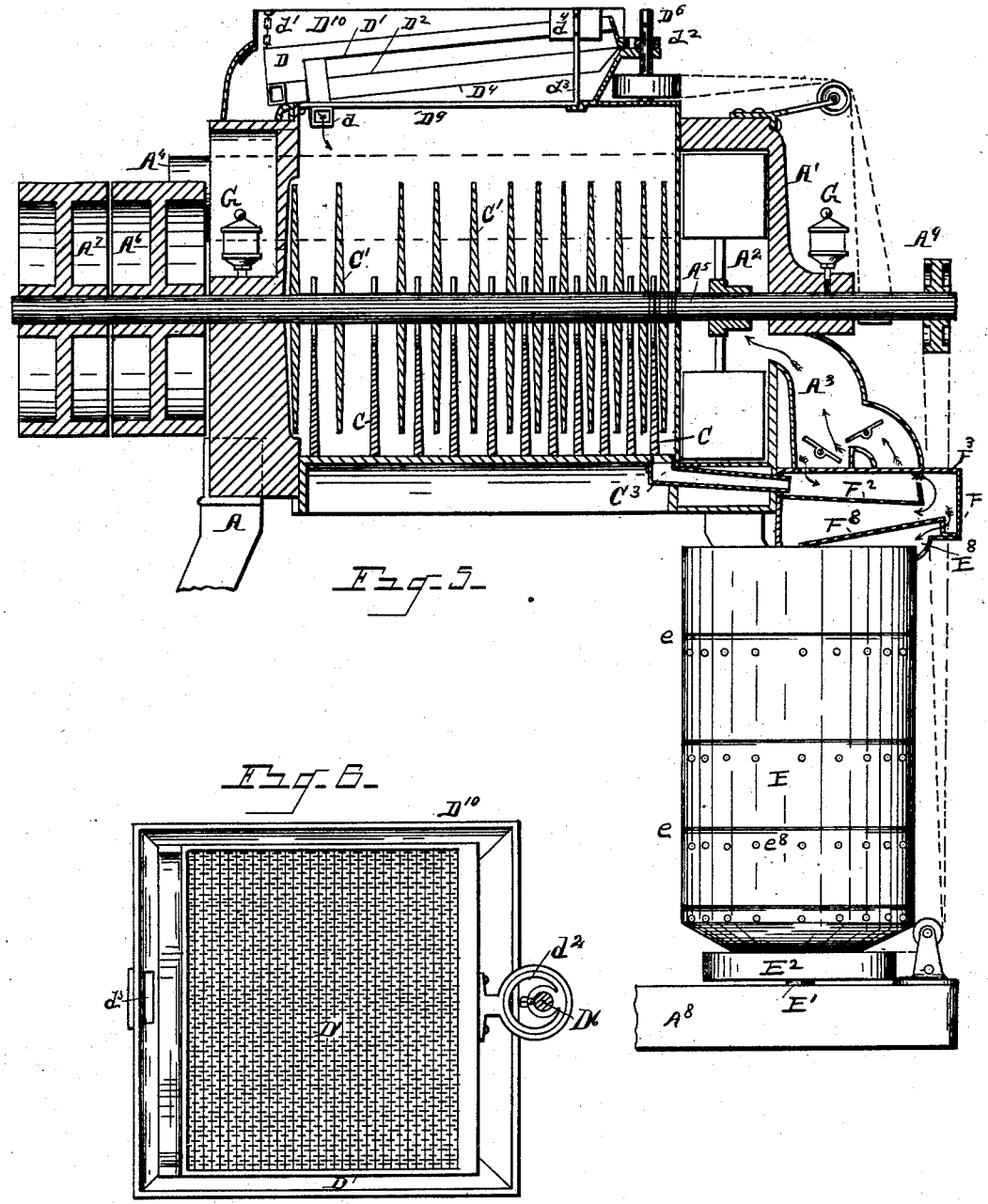

(No Model.) 6 Sheets—Sheet 5.
G. W. MEAD.
GRAIN SCOURING OR POLISHING MACHINE.
No. 522,996. Patented July 17, 1894.
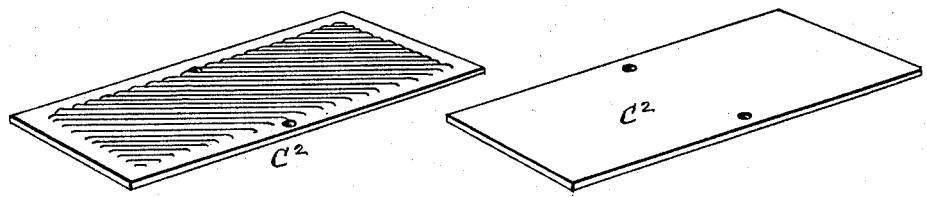
Fig. 7. Fig. 8.
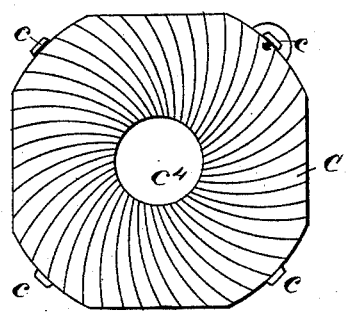 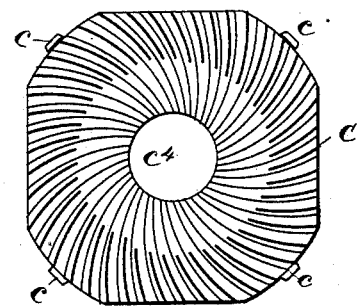
Fig. 9. Fig. 10.
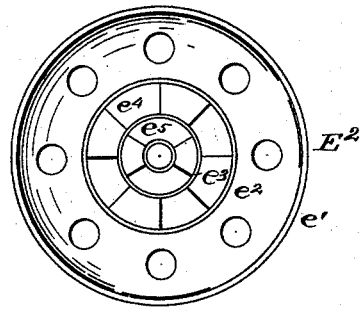 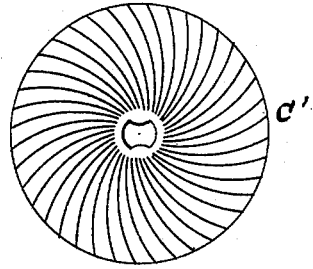
Fig. 11. Fig. 12.
Witnesses
O. B. Barringer.
John F. Miller
George W. Mead Inventor
By Attorney
Newell S. Wright
THE NORRIS PETERS CO., PHOTO-LITHO., WASHINGTON, D. C.

(No Model.)  6 Sheets—Sheet 6.

G. W. MEAD.
GRAIN SCOURING OR POLISHING MACHINE.

No. 522,996. Patented July 17, 1894.

WITNESSES
O. B. Barringer
John F. Miller

INVENTOR
George W. Mead
By his Attorney
Newell S. Wright

UNITED STATES PATENT OFFICE.

GEORGE W. MEAD, OF TECUMSEH, MICHIGAN.

GRAIN SCOURING OR POLISHING MACHINE.

SPECIFICATION forming part of Letters Patent No. 522,996, dated July 17, 1894.

Application filed July 31, 1893. Serial No. 481,961. (No model.)

*To all whom it may concern:*

Be it known that I, GEORGE W. MEAD, a citizen of the United States, residing at Tecumseh, county of Lenawee, State of Michigan, have invented a certain new and useful Improvement in Grain Scouring and Polishing Machines; and I declare the following to be a full, clear, and exact description of the same, such as will enable others skilled in the art to which it appertains to make and use the same, reference being had to the accompanying drawings, which form a part of this specification.

My invention relates to a new and useful improvement in a grain scouring and polishing machine.

The objects of my invention contemplate and include the general construction, combination and arrangement of devices and appliances hereinafter described and claimed, and pointed out in the claims and illustrated in the accompanying drawings, in which—

Figure 1:
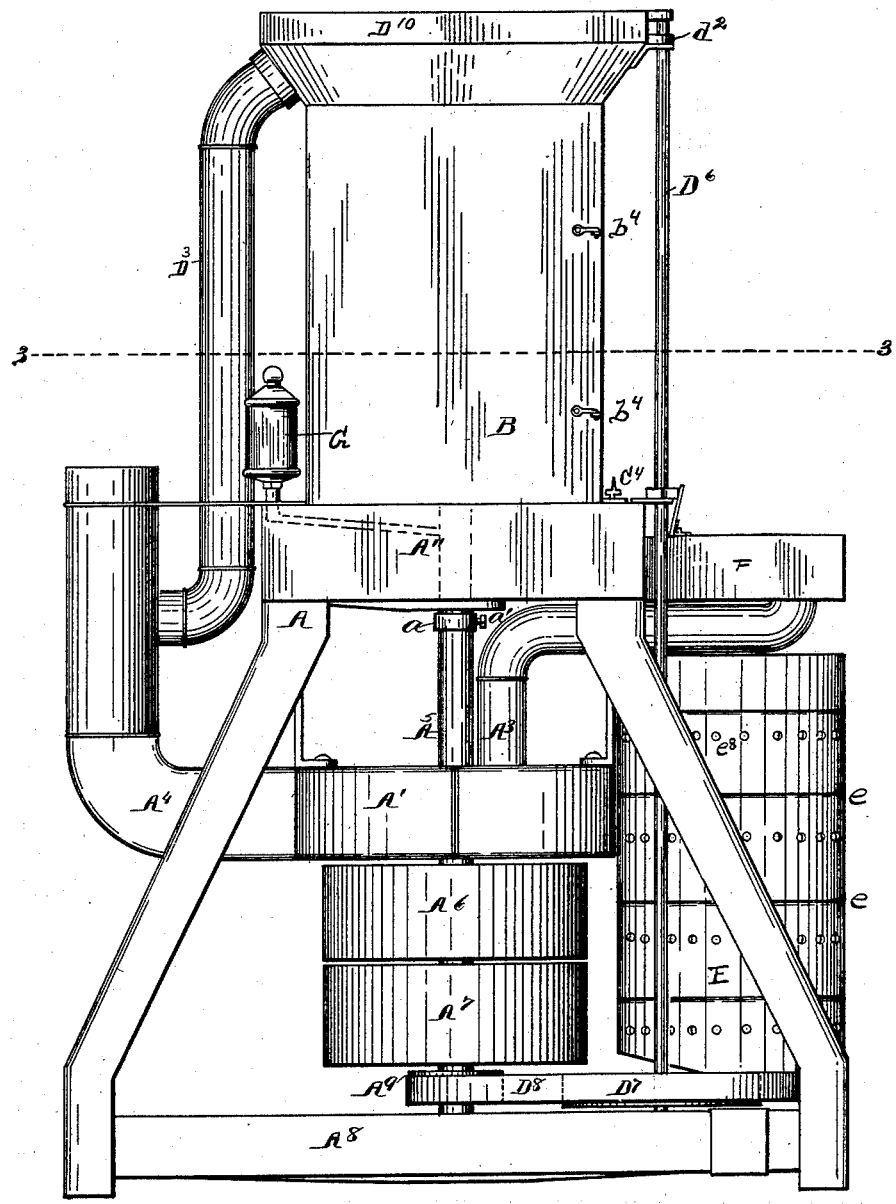
Figure 2:
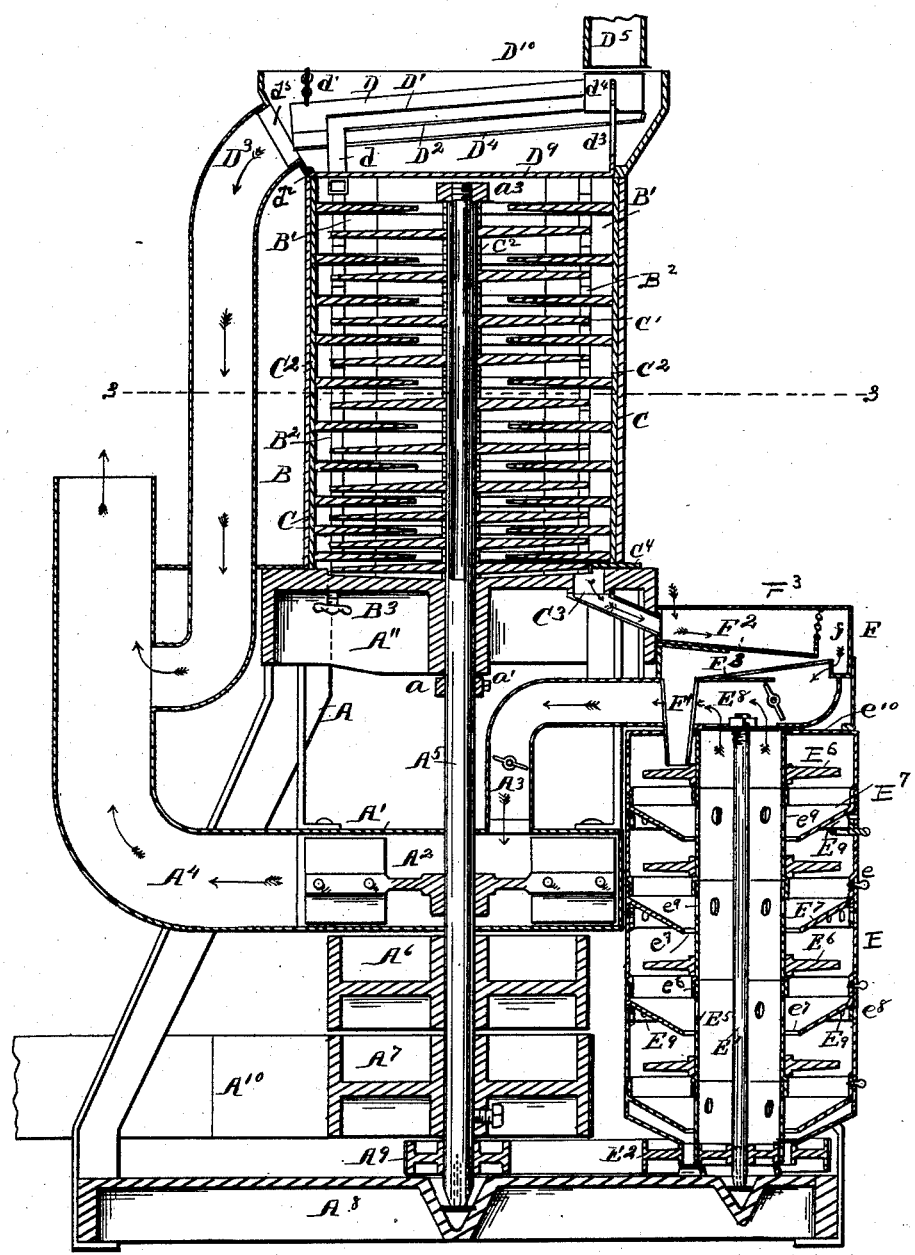
Figure 15:
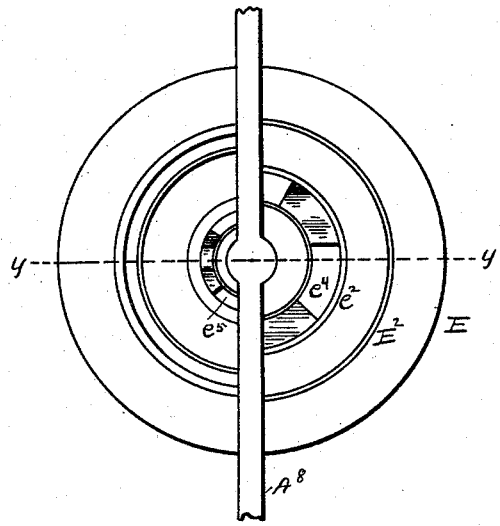
Figure 16:
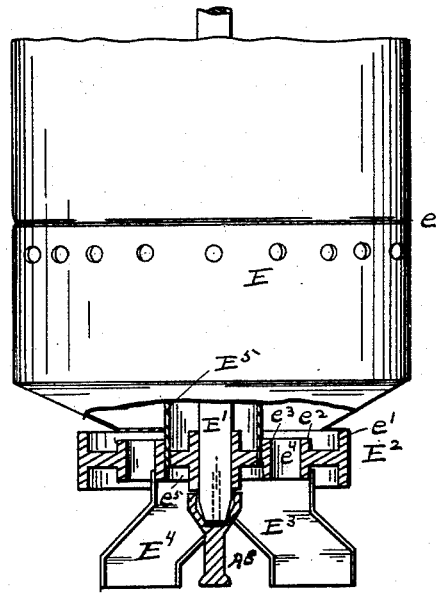
Figure 13:
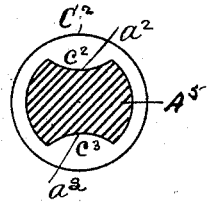
Figure 14:
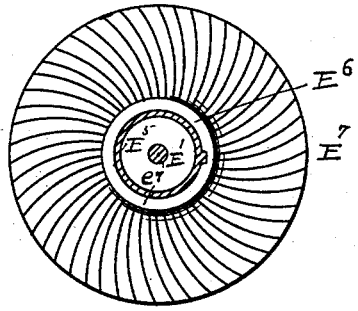

Figure 1 is a side elevation, embodying features of my invention. Fig. 2 is a vertical section of the same, showing parts in elevation. Fig. 3 is a horizontal section on the line 3—3, Figs. 1 and 2. Fig. 4 is a detail view in vertical section of the scourer E. Fig. 5 is a modification wherein portions of the scouring mechanism are located horizontally, the same being shown in vertical longitudinal section with other parts in elevation. Fig. 6 is a plan view of the hopper. Fig. 7 is a detail view in perspective of one of the side plates in the scouring drum, showing the corrugated surface thereof. Fig. 8 is a similar view of the opposite side. Fig. 9 is a plan view, showing one side of one of the stationary plates. Fig. 10 is a similar view of the opposite side. Fig. 11 is a plan view of the revolving pulley $E^2$. Fig. 12 is a plan view of one of the revolving plates, the opposite side of the same plate being shown in plan in Fig. 3. Fig. 13 is an enlarged view in detail, showing the construction of the division rings and adjacent portion of the driving shaft. Fig. 14 is a separate view of one of the plates $E^6$. Fig. 15 is an inverted plan view of the scourer E. Fig. 16 is a view partly in elevation and partly in section, showing details of the construction of the scourer E, the section being on the line $y$—$y$, Fig. 15.

I carry out my invention as follows:

My improved grain scouring and polishing machine consists essentially of a reversible scourer B, a detachable hopper connected therewith, a detachable revolving scourer E, and a detachable magnetic separator located intermediate the reversible scourer B and the revolving scourer E and discharging into the latter. These elements are herewith shown in combination, but I would have it understood that the reversible scourer B may be used independent of the other features of the machine if desired, and that I wish to cover as coming within the scope of my invention various elements of the machine herewith shown and described in combination, independently of other related features, inasmuch as several features of the machine are capable of either independent use or in combination one with another.

A represents any suitable supporting frame.

A' is a fan case, and $A^2$ any suitable fan located therein.

$A^3$ is an induction pipe leading into the fan case, and $A^4$ is an eduction pipe leading from the fan case.

$A^5$ is the main driving shaft, serving to drive the fan as well as other parts to be hereinafter named.

$A^6$ represents a loose, and $A^7$ a fast pulley located upon said shaft. The said shaft is journaled at its base in any suitable manner, as upon a cross tree $A^8$, engaged with the supporting frame A.

$A^9$ is an additional pulley upon the lower end of the driving shaft for driving the revolving scourer E, which is yet to be described.

$A^{10}$ indicates the driving belt.

I will next proceed to explain the construction and arrangement of the reversible scourer B. $A^{11}$ is the base plate thereof, the same being a part of the supporting frame, the driving shaft passing therethrough and having a bearing therein, the shaft being provided with a collar "$a$" thereunder, the collar being adjustable by a set screw "$a'$."

B is a scourer in the drum or case of which the driving shaft $A^5$ is extended. The case or drum of the scourer B is preferably made square in cross section, and having located in the four corners thereof, stationary posts B', shaped on their outer sides in the form of a right angle in cross section to conform to the drum and made of concave form on their inner surfaces, as shown. The inner concaved faces of these four stationary posts B' are provided with circular grooves "b," extending longitudinally of the posts within which grooves are located sliding posts B², preferably made halfround on one side to conform to the grooves, and grooved as at "b'" on the opposite side thereof.

C represents a series of stationary plates, each constructed with ears "c," adapted to fit into the grooves "b'" of said posts, the same being held in place in any suitable manner, as by set screws "c'" in all four corners, the ears "c" being upturned, preferably to receive said set screws. These posts B' are all made to be raised or lowered, as by means of a hand screw B³, situated underneath the base plate A¹¹. The stationary plates C are all raised together with the sliding posts B².

Upon the shaft A⁵ is engaged a series of revolving plates C', rotatable with the shaft. The vertical adjustment of the stationary plates C will bring them nearer to or farther from the revolving plates, as may be desired for any required work. The revolving plates are separated upon the driving shaft A⁵ by means of a suitable number of division rings C².

As shown more particularly in Fig. 13, that portion of the driving shaft extending within the drum of the scourer B is preferably recessed upon opposite sides, as shown at "a²," the division rings being provided with inwardly projecting ears "c²," "c³," fitted into said recesses of the driving shaft. In this manner they are held to turn with the shaft. As many of these division rings may be located between the revolving plates as may be desired.

Upon the upper end of the driving shaft is engaged a nut "a³," which may be screwed down tightly to bind the division rings and revolving plates in place upon the shaft.

The stationary plates are beveled inwardly at any proper angle from the exterior toward the central opening "c⁴," said opening being provided for the passage of grain therethrough. The upper and under faces of each of said plates are also corrugated or grooved in any desired manner to provide a scouring surface. Thus, for example, one of the faces of said plates is formed with, say forty-eight grooves, curved from left to right from the outside edge to the center opening. The other face of said plate may be formed with grooves, say forty-eight in number, curved from left to right from the outer edge to the center opening, and with an equal number of grooves extending from the outer edge inward half the distance to the center. These plates are reversible, so that either surface may be placed upward according to the kind of work required. Their shape is shown in Fig. 9, having rounded corners and intermediate straight edges. The revolving plates C' are also grooved or corrugated, as may be desired, on both their upper and under surfaces, and are made reversible, the two corrugated surfaces, the one being more finely corrugated or grooved than the opposite surface. These revolving plates are beveled from toward the center outwardly at any proper angle, the portion thereof adjacent to the division rings being flat.

At the four sides of the drum between the stationary posts I locate four perpendicular plates, indicated at C², against which the stationary plates C rest. Each of these perpendicular plates I construct preferably with one flat smooth surface, the opposite surface being grooved or corrugated as shown in Fig. 7, said perpendicular plates being reversible. The stationary plates C project inwardly therefrom as so many inclined shelves for the grain to fall upon and from which it is passed inwardly from the outside and through the central orifices thereof. The revolving plates C' throw the grain off from their peripheries upon these stationary plates, and work it inward off from the stationary plates, the device thereby effecting a self feed of the grain through the reversible scourer B. I am enabled thereby to effect a three-fold adjustment of the mechanism by reversing the stationary plates, by reversing the revolving plates, and by reversing the upright plates, thereby presenting any required surface to the grain to secure any degree of attrition and scouring desired. The grain, it will be seen, is passed thus outward and inward between the stationary and revolving corrugated plates through the entire series and along the surfaces of the upright plates, the stationary plates being adjusted to or from the revolving plates, as may be required. Thus the grain is automatically worked back and forth from the center outward, and vice versa, passing over the corrugated surfaces of the various plates until it reaches the bottom of the reversible scourer B, from which it is passed by means of a chute C³ communicating with the interior of said scourer through the base thereof.

As many stationary plates and revolving plates may be provided as may be needed, and readily set any proper distance apart.

I will now proceed to describe the detachable hopper, which discharges the grain into the reversible scourer B.

Accordingly D represents a sieve supporting frame or hopper case, constructed preferably of metal, and resting over the upper end of the drum of the scourer B, as shown in Fig. 2. Within this hopper frame is located preferably two screens or sieves D' and D². These sieves or screens may be of any desired construction, as of perforated metal or wire gauze. The upper screen is designed to be of such construction as to allow all the grain to pass therethrough, but to separate therefrom all larger substances, the grain falling through upon the lower screen, the larger substances passing over the sieve at its lower end into a chute D³ leading into the eduction pipe A⁴, communicating with the interior of the fan case, a suction being thus provided to assist in separating the coarse substances from the grain. The grain falling upon the under screen, which is of finer mesh, is separated from all substances smaller than the grain, the screen being made to allow all smaller substances than the grain to pass therethrough. The grain being prevented from passing through the screen is discharged therefrom through a chute "$d$" into the scourer B. The smaller substances passing through the lower screen fall upon a solid sheet bottom D⁴, from which it is discharged into the chute or duct D³.

The grain may be discharged into the hopper from a spout D⁵, which may lead from a grain bin. These screens D', D² and the bottom sheet D⁴ are preferably removable and all engaged in the frame D. This frame is agitated in any suitable manner. Thus at the lower end it may be suspended by chains "$d'$," allowing the screens to have any desired pitch. The opposite side of the said frame may be connected by an eccentric "$d^2$" upon a vertical rotatable shaft D⁶, having a pulley D⁷ at its lower end driven from the driving shaft A⁵, as by a belt D⁸. This connection will give the desired reciprocatory motion to the hopper frame, its screens and bottom sheet.

Between the reversible scourer B and hopper, I prefer to locate a metal sheet D⁹, through which passes the spout or chute "$d$." This sheet is hinged at one side as shown at "$d^2$," allowing the sheet to rise by the pressure of grain thereunder when the drum of the reversible scourer B gets too full of grain. To the upper side of this sheet D⁹ is engaged an arm "$d^3$," supporting a shell "$d^4$" of suitable size and form to shut off the inflow of grain from the chute D⁵. When the pressure of the grain below the sheet D⁹ is relieved the shell "$d^4$" drops, allowing grain again to feed into the hopper and regulating the feed as may be required.

The hopper D, with its related parts is located in an outer hopper D¹⁰, provided with an outlet "$d^5$," leading into the duct D³. I also provide a shut off slide C⁴ to regulate the passage of grain out of the reversible scourer B into the chute C³. The adjacent stationary plate may be cut away to allow the working of said slide.

I will now proceed to describe the revolving scourer E and also the magnetic separator thereabove.

E denotes a revolving scourer, the drum or case of which is preferably made in sections, sleeved together like the sections of a stove pipe, as shown at "$e$."

E' is the center shaft, journaled in any suitable manner at its lower end, as upon the cross tree A⁸ of the supporting frame.

E² denotes the driving pulley on the lower end of said center shaft. Said pulley is preferably made with an outer flange "$e'$," and with inner flanges "$e^2$" and "$e^3$." Between the flanges "$e^2$" and "$e^3$" the pulley is perforated or cut away as shown at "$e^4$." Within the flange "$e^2$" are other openings "$e^5$." Communicating through these openings in said pulley are discharge pipes E³ and E⁴, the pipe or spout E³ communicating through the openings "$e^4$" serving to carry off the grain after being worked through the revolving scourer E, the other spout E⁴ communicating through the openings "$e^5$" serving to carry off all coarse substances discharged from the revolving scourer E.

E⁵ denotes a revolving pipe, resting at its lower end upon the pulley E² about the flange "$e^3$." This revolving pipe is also preferably made in sections sleeved together, as shown at "$e^6$."

E⁶ denotes a series of revoluble plates engaged upon the revolving pipe E⁵ in any suitable manner, constructed with a central orifice to fit thereover, and slanting outwardly toward the periphery. These plates are preferably made smooth on their under surfaces, and grooved or corrugated upon their upper surfaces, as for example with a suitable number of grooves curved from right to left. These plates may have their surfaces reversed if desired, to increase or diminish the polishing capacity of the revolving scourer E.

E⁷ represents a series of stationary shelves engaged upon the inside of the sections of the drum, said shelves being annular, having a central orifice, as at "$e^7$." These shelves slant inward from their periphery to said central orifice. Immediately therebeneath the drum section is provided with a series of orifices, as indicated at "$e^8$." Also beneath the plates E⁶ the sections of the central pipe E⁵ are provided with a series of orifices "$e^9$."

The pipe E⁵ is open at the upper end and communicates with a chamber E⁸ thereabove, leading into the induction pipe A³ communicating with the suction fan. In this manner it will be seen, the air is sucked into the revolving scourer E through the drum and through interior pipe E⁵ and discharged therefrom into the induction pipe A³.

The magnetic separator is located above the revolving scourer E and consists of a case F constructed with a spout F', leading from the bottom thereof through the chamber E⁸ and through the top "$e^{10}$" of the scourer E. Within this case is supported a screen F², constructed to allow the grain to pass therethrough. The lower end of this screen may be hung upon a chain "$f$." Its opposite end may be engaged with a rod "$f'$" hinged upon the cover F³ of the case F, as shown at "$f^2$."

The screen may be vibrated in any suitable manner, as by means of a square knuckle "$d^5$" upon the rotatable shaft D⁶, the rod "$f'$" being extended up alongside said knuckle. Any other suitable means may, however, be employed to agitate the screen F².

The grain discharged from the reversible scourer B through the duct C³ falls upon the screen F², and it will be observed that the grain discharged from said scourer B is mingled with the scourings or substances removed from the grain in its progress through said scourer B, together with any impurities, should there be any, not removed by the hopper above the scourer B.

The case F may be perforated as required to permit a desired amount of air to be sucked thereinto by the fan, the base of said case communicating with the chamber E⁸. The grain passing through the screen F² is thus in contact with currents of air drawn in by the fan, having a tendency to carry therewith the scourings or impurities mingled with the grain. The grain falls through the sieve upon a magnetic sheet metal sheet F⁸, which serves effectually to extract all particles of metal, if any, which have been mixed with the grain. The grain runs off from this magnetic sheet through the spout F' into the revolving scourer E therebeneath.

In the magnetic separator the grain is separated, together with the metal, and other impurities, the said separator thus effecting a three-fold separation. In the revolving scourer E, the grain is separated and discharged through the chute E³, the heavier impurities are separated and discharged through the chute E⁴, and the lighter impurities are separated and discharged therefrom through the fan. These combined separations of the hopper, reversible scourer B, magnetic separator and revolving scourer E effect, it will be seen, a most perfect scouring, polishing and cleaning of the grain, while also the means of adjusting the different parts of the scouring devices, are such as to enable the grain to be effectually scoured, polished and cleaned, without waste of grain, and all in a single operation.

The grain entering the revolving scourer E falls upon the upper revolving plate E⁶, and is thrown off from its periphery, in contact with air currents upon the adjacent stationary shelf or plate E⁷ therebeneath, which again allows the grain to fall to the center and upon the next revolving plate below, and so on through the scourer E, fresh air currents being passed through the grain as it is in motion, removing all substances lighter than the grain.

I prefer to make the shafts A⁵ and E' hollow, with a steel plug in the base of each provided with a wick, the said plug being supported in a conical socket formed of Babbitt metal in the cross tree A⁸. Oil is admitted into the top of these shafts and is fed through said wicks to oil said sockets.

G denotes suitable oilers to feed oil to various parts to be lubricated.

Sliding shut offs E⁹ may be employed to regulate the inflow of air into the drum E.

So far I have described my invention as applied to a perpendicular machine. In Fig. 5, however, I have shown the scourer B located in a horizontal position, the grain passing thereinto from the hopper at one end thereof, the fan being located at the opposite end, and the grain being discharged at the end opposite the hopper into the revolving scourer B. This construction requires a modification in the driving mechanism, but my invention contemplates any suitable driving mechanism to be employed in connection therewith.

When the reversible scourer B is located horizontally, the stationary plates C preferably extend to a little way above the shaft, as shown in Fig. 5. When so located, moreover, the fan case is modified in construction to correspond and the hopper is located over the upper side of the case on said scourer B.

The drum of the scourer B is preferably made removable in any suitable manner, as for example by making the same in two parts hinged together, as at "b³" at one corner and providing a suitable fastening "b⁴" at the opposite corner, as shown.

What I claim as my invention is—

1. The reversible scourer herein described having in combination an inclosing drum, posts B', and sliding bars B², non-rotatable plates C engaged with said bars, rotatable plates C', and means to raise said sliding bars to adjust the non-rotatable plates, substantially as described.

2. The reversible scourer herein described having in combination an inclosing case or drum, reversible non-rotatable plates C, reversible rotatable plates C', and reversible upright plates C², substantially as described.

3. The reversible scourer herein described having in combination a supporting base, an inclosing drum made square in cross section, corner posts B' located in the corners of said drum and having inner concaved faces, sliding bars engaged with said corner posts, non-rotatable corrugated plates engaged with said sliding bars and made adjustable thereby, upright plates located within the case between said upright posts and rotatable plates C' arranged alternately with the non-rotatable plates, substantially as described.

4. In combination a scourer having a movable sheet D⁹, an agitable screen to discharge grain into said separator, said sheet D⁹ provided with a feed regulating device operated by the uplift of the sheet from the pressure of grain within said scourer, substantially as described.

5. In a grain scouring machine, the combination of a drum B, removable corner posts B', sliding bars engaged with said posts, removable non-rotatable plates engaged with said bars, a driving shaft, removable rotatable plates engaged with said shaft, and removable vertical plates located between the corner posts, substantially as described.

6. A grain scourer having in combination a square inclosing drum, non-rotatable corrugated plates C, rotatable corrugated plates C′, and flat reversible upright plates C², the plates C projecting inwardly therefrom, substantially as described.

7. A grain scourer having in combination a supporting frame provided with a supporting base, an inclosing drum engaged with said base, a series of removable non-rotatable plates C′ open at their center, a driving shaft, and a series of removable rotatable plates engaged with said shaft, said stationary plates and rotatable plates being reversible and alternately arranged, substantially as described.

8. In a grain scouring machine, the scourer E herein described, consisting of an inclosing perforated drum, a series of stationary inwardly inclined plates E⁷ open at their centers, an interior hollow perforated rotatable pipe E⁵ open at its extremities, a series of rotatable plates engaged with said interior pipe, a suction pipe communicating with the interior of said drum and pipe at their upper ends to carry off the lighter portions of the stock, the heavier portions of the stock being discharged through the base of said interior pipe and drum, a driving pulley E² upon the case of said driving shaft, and discharge pipes E³ E⁴ communicating through said pulley with said pipe and drum, substantially as described.

9. In a grain scouring machine, the scourer E herein described consisting of an inclosing perforated drum, a series of stationary inwardly inclined plates E⁷ open at their centers, an interior hollow perforated rotatable pipe E⁵ open at its extremities, a series of rotatable plates engaged with said interior pipe, a suction pipe communicating with the interior of said drum and pipe at their upper ends, to carry off the lighter portions of the stock, the heavier portions of the stock being discharged through the base of said interior pipe and drum, a driving pulley E² constructed with flanges e′, e², e³ and with perforations e⁴, e⁵ located upon the base of said driving shaft and discharge pipes E³, E⁴ communicating through said perforations of the pulley with said pipe and drum, substantially as set forth.

In testimony whereof I sign this specification in the presence of two witnesses.

GEORGE W. MEAD.

Witnesses:
JOHN LOWRY,
H. L. JONES.